Nov. 9, 1965   J. MARTIN ETAL   3,216,773
PHONOGRAPH RECORD RACK AND SELECTOR
Filed April 30, 1963   3 Sheets-Sheet 1
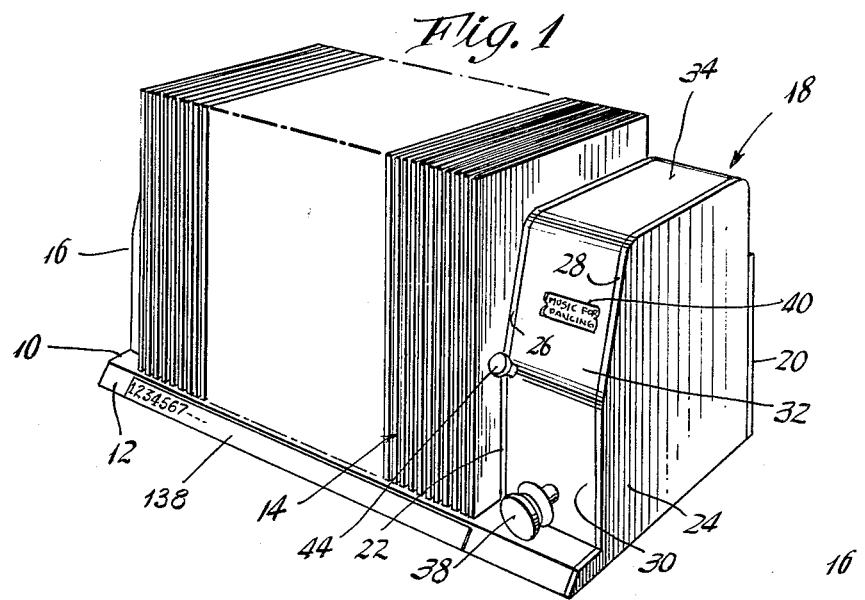
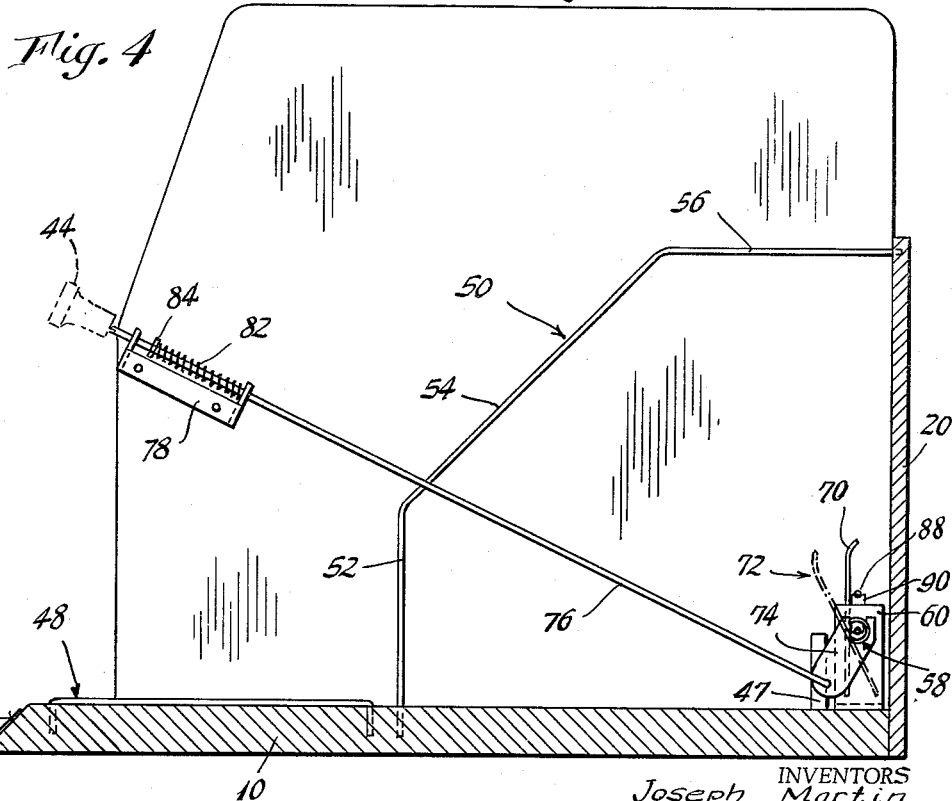
INVENTORS
Joseph Martin
Arthur C. Vaegely
BY
AGENT

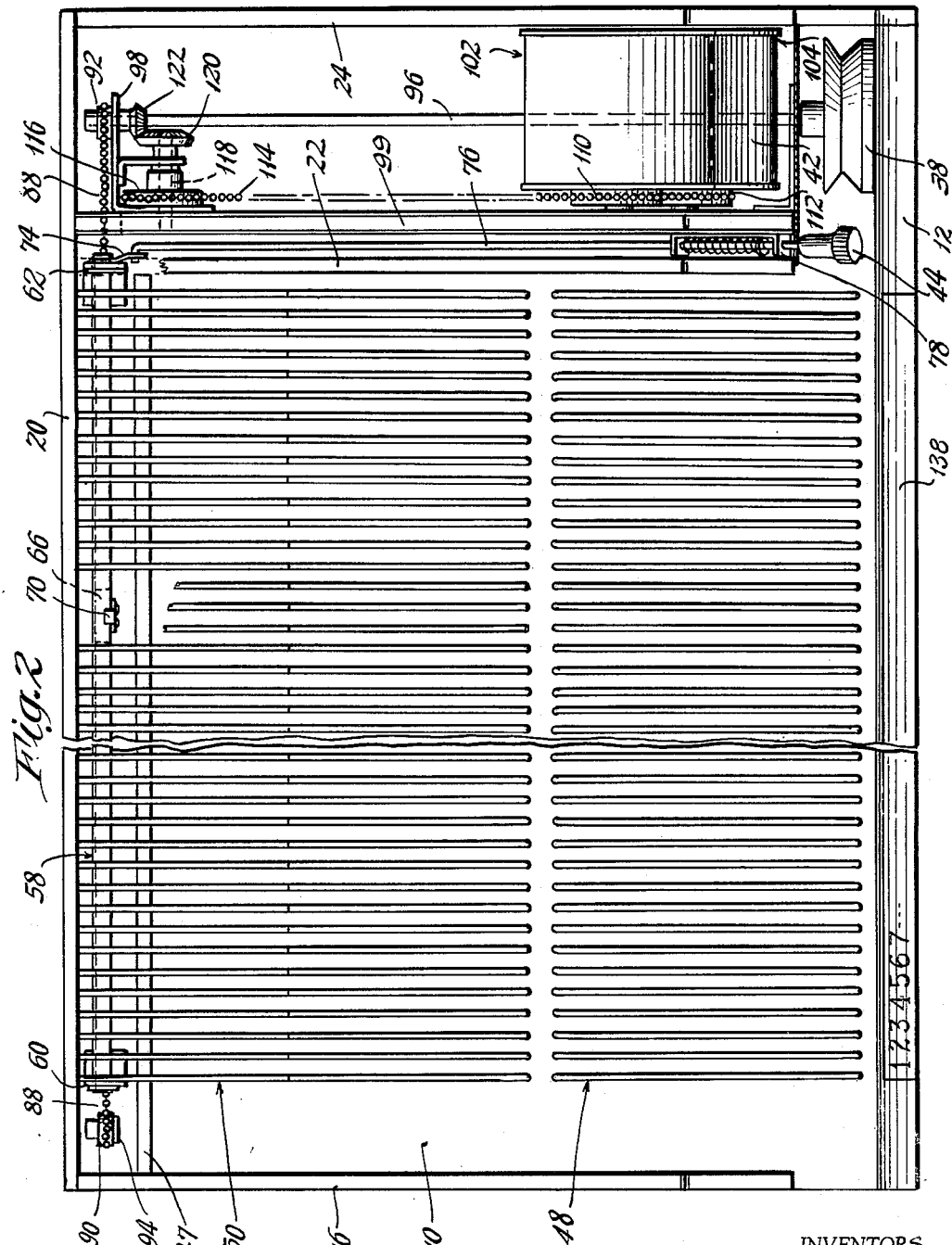

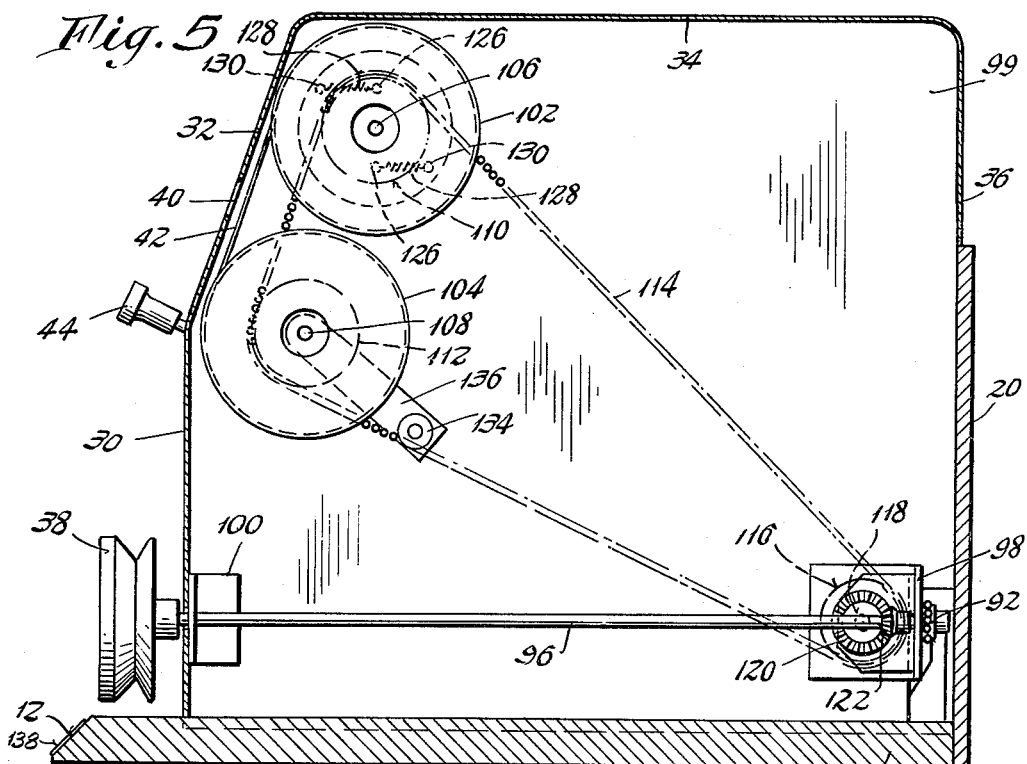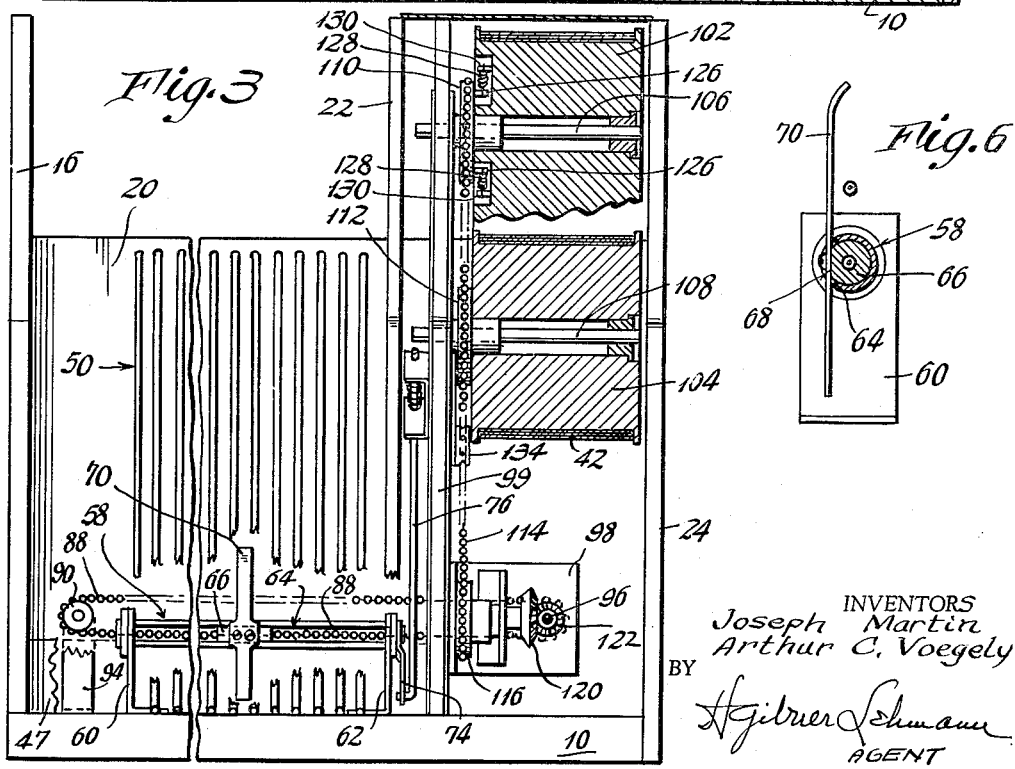

3,216,773
PHONOGRAPH RECORD RACK AND SELECTOR
Joseph Martin, 169—17 Northern Blvd., Flushing, N.Y., and Arthur C. Voegely, 5 Robert Circle, Syosset, N.Y.
Filed Apr. 30, 1963, Ser. No. 276,894
6 Claims. (Cl. 312—19)

This invention relates to phonograph record holder and selector means, and more particularly to devices of this type wherein an actual mechanical ejection of a selected record is effected.

An object of the invention is to provide a novel and improved combination phonograph record rack and selector-ejector device, which has been reduced to an especially simple form and construction, involving few, readily available components.

Another object of the invention is to provide an improved combination device as above set forth, which may be readily, economically fabricated.

A further object of the invention is to provide an improved rack and selector-ejector device as characterized, which is especially effective and reliable in its operation.

Yet another object of the invention is to provide a novel combination device in accordance with the foregoing, which holds a relatively large number of records, preferably in their stiff board envelopes, yet is compact and of comparatively small size, and of attractive appearance.

Features of the invention reside in the provision of an improved combination rack and selector-ejector device as above outlined, which is simple to understand and operate, durable in construction, and not susceptible to malfunctioning.

Other features and advantages will hereinafter appear.

In the drawings accompanying this specification, similar characters of reference are used to designate like components throughout the several views, in which:

FIG. 1 is a front perspective view of the improved combination rack and selector-ejector device, shown filled to capacity with phonograph records in stiff board envelopes.

FIG. 2 is a top plan view of the rack and selector device, with portions broken away to reveal interior details.

FIG. 3 is a front elevational view of the rack and selector device, also shown with portions broken away to reveal other interior details.

FIG. 4 is a vertical section taken on the line 4—4 of FIG. 2.

FIG. 5 is an elevational view of the right side of the rack and selector device, with broken-away portions to illustrate still other interior details.

FIG. 6 is an elevational view of the ejector arm taken on a vertical section line on its right hand side in FIG. 3.

Considering first FIG. 1, the improved record holder and selector device of the invention is shown as comprising a generally flat, rectangular base 10 in the form of a board having a pronounced front bevel 12, said base being adapted to support on edge an appreciable number of phonograph records 14, preferably carried in stiff jackets or envelopes. The base 10 has a size which is sufficiently great to provide a capacity of approximately 50 records and jackets.

At its left end the base 10 has an upstanding end wall 16, and at the right end portion there is an upright housing 18, the latter and the end wall 16 being joined at the rear by a back wall 20.

The housing 18 may be constructed in any suitable manner. As shown herein, it comprises three upstanding walls 22, 24 and 99 arranged in parallel relation, the walls 22 and 24 being seen (FIG. 1) as having at their upper portions backwardly sloped front edges 26 and 28 respectively. The housing 18 further comprises a cover piece having a perpendicular front wall portion 30, a rearwardly sloping front wall portion 32, a top wall portion 34 and a downwardly extending or depending rear wall portion 36.

Located at the lower front portion of the housing 18 is a manually operable, turnable knob 38, and in the rearwardly sloping front wall portion 32 there is provided a rectangular window 40 behind which a tape 42 is movable. Also provided at the front of the housing 18 is a manually operable knob 44 which, when pushed, serves to eject the selected record in a manner to be described in detail below.

Referring now to FIGS. 2–4, the base board 10 and the back wall 36 are provided with a record stop strip 47 and with separator members in the form of two series of wires 48 and 50, the wires 48 being disposed flat on the base board in evenly-spaced parallel relation whereby they mark off or separate individual stall spaces each arranged to accommodate one record either with or without its stiff board jacket or envelope. The wires 50 have upright portions 52, backwardly sloping portions 54, and horizontal portions 56 which further define the separate spaces or stalls for the records 14. While the rack means illustrated herein is in the form of the sets of wires 48, 50, any other suitable separator or rack device may be utilized without departing from the spirit of the invention, provided there is effected a separation of the individual records 14, with such records being maintained in upright positions as illustrated in FIG. 1. The invention is not concerned with the specific rack means or wires 48, 50 per se.

By the present invention a novel, simplified and improved selector and ejector means is provided, by which any desired record may be selected and mechanically ejected or shifted forward, in a simple and easily effected manner. The said means comprises an elongate track member 58 which extends substantially parallel to the axis of the records 14 and past the rear lower edges of such records, said track being turnable about a longitudinal axis by virtue of its being mounted in end bearing pieces 60, 62. The turnable track 58 preferably has a relatively wide longitudinally extending slit 64 throughout its length, and carries within it a slidable carriage piece 66 in the form of a cylindrical plug or block having a flatted side 68 to which there is secured an upright arm or push member 70 adapted to engage and eject any one of the records 14, depending on the location of the carriage 66 along the track 58. Such ejection of a record is effected by causing a slight turning movement of the track 58, carriage 66 and push member 70, as indicated by the dotted line position 72 shown in FIG. 4. Normally the track 58, carriage 66 and push member 70 are in the full-line positions shown in FIG. 4, wherein the push member is substantially vertical and able to travel without interference along the rear edges of the records 14. The member 70 has sufficient width so that it need not be precisely positioned behind the particular record which is to be ejected, but instead may be approximately located at the rear of such record and still remain effective to accomplish the desired ejection. It will be understood that, upon a slight turning movement of the track 58 as mentioned above and tilting movement of the push member 70, the curved upper extremity of such member will be brought into engagement with the rear edge of the particular record behind which it is located and will shift such record forward an extent sufficient to enable the record to be easily grasped by hand and removed from the rack.

In accordance with the invention, the tilting of the track 58 is effected by a drive arm 74 rigidly secured to the right end of the track as viewed in FIGS. 2 and 3.

Pivotally connected to the extremity of the drive arm 74 is a link rod 76 which extends forward and upward, passing through a bearing bracket 78 carried by the side wall 22 of the housing 18, there bing the manually engageable knob 44 on the front, upper extremity of the link rod. A spring 82 carried by the rod 76 at the bracket 78 normally pulls the rod and the knob 44 to a forward position as shown in FIG. 4, wherein the ejector arm 70 is substantially vertical or upright. The spring 82 is of the compresison type, engaging a stop washer 84 rigidly secured to the rod 76 for the purpose mentioned.

It will now be understood from the foregoing that the carriage or slider block 66 may be shifted along the track 58 to any of a large number of different positions, as for example 50 positions where this number of records is to be accommodated in the device. Regardless of the position which is occupied by the carriage 66 and push arm 70, these parts together with the track 58 may be tilted when the operator pushes inward or depresses the knob 44, and such tilting will effect an ejection of any record and its wrapper which might be located in front of the push member 70.

Novel means are provided, in accordance with the invention, in conjunction with the tiltable or turnable track 58 and carriage means 66 and 70, to effect shifting of the latter in either of opposite directions along the track 58 without impeding tilting or turning of the track and carriage. Such means comprises a chain of loosely coupled beads or balls 88, said chain extending through the bore or hollow space of the track 58 from one end thereof to the other and being secured to opposite ends of the carriage block 66. The chain 88 of beads passes over direction-changing and drive, notched pulleys or sprockets 90, 92 located beyond the opposite ends of the track 58, there being an unbroken chain section extending between the sprockets and located at the exterior of and above the track 58. The sprocket 90 is mounted in a suitable upright bracket 94 rigidly attached to the base board 10 closely adjacent one end of the tubular member or track 58 as seen in FIG. 3. The drive sprocket 92 is carried by a shaft 96 which has a bearing in a bracket 98 secured to the side wall 99 of the housing 18, such shaft extending forward and carrying at it front end the knob 38. A suitable bearing bracket 100 is provided for the front portion of the shaft 96, being mounted on the vertical wall 99 of the cover member, as shown in FIG. 5.

By such organization, turning of the knob 38 will effect a shifting of the carriage block 66 and the push member 70 along the tiltable track 58, whereby the push member may be disposed directly behind any desired one of the records 14. Also, the individually turnable beads of the chain will enable unimpeded turning of the track and carriage to be had.

In accordance with the invention, a convenient indicator tape organization is provided, to be actuated simultaneously with the carriage 66 and push member 70 as these are shifted along the track 58 in response to turning of the knob 38. The said indicator tape device is chain driven, and comprises a pair of turnable drums 102, 104 which are disposed in parallel relation and one above the other as indicated in FIG. 5. The drums 102, 104 have parallel horizontal axes and are located closely adjacent each other. Wound around the drums a number of times is the tape 42 which extends from one drum to the other, so as to be readily visible at the window 40. The tape may be of suitable plastic composition, such as Mylar having a matte finish by which it may be readily marked, using a pencil, ball pen or the like. The user marks the tape 42 at regular intervals with the names of the selections on the records 14. One such name is indicated in FIG. 1.

The drums 102, 104 are carried on stationary shafts or rods 106 and 108 respectively, such rods being mounted on the housing wall 99 as seen in FIG. 3. Also carried by the rods 106, 108 are sprockets 110, 112 over which a chain 114 of loose beads passes, such chain also extending around a third sprocket 116 carried by a shaft 118 which bears in the angle bracket 98. The shaft 118 has a bevel gear 120 which meshes with a smaller bevel gear 122 rigid on the shaft 96. By such organization, turning of the knob 38 and shaft 96 will effect a turning or drive of the sprocket 116 whereby the chain 114 will be driven, in turn driving the two sprockets 110, 112. The sprocket 112 is rigidly affixed to the drum 104, and the sprocket 110 has a spring-charged connection to the drum 102, this latter being indicated in FIG. 5. Such spring-charged connection comprises pins 126 carried by the drum, extension springs 128 connected with the pins 126 and with pins 130 carried by the drum 102. The springs 128 are normally continually under tension, and the organization is such that the tape 42 having its ends fastened to the drums respectively remains taut normally does not stretch between the drums 102 and 104 throughout the turning movement of the latter in response to turning of the knob 38.

Thus, by the foregoing arrangement the movement of the secured tape 42 is correlated with the shifting movement of the carriage block 66 along the tiltable track 58. The tape 42 is so marked that it will indicate, by the name of the selection, the particular record behind which the carriage block 66 and push member 70 are located at any time.

It will be noted however, that even though a relationship has been established between the movements of the tape 42 and the carriage 66, such relationship in no way interferes with the tilting or turning of the track 58 and carriage 66 as this is effected by the actuator arm 74 and push rod 76. Thus, the invention provides an advantageous mechanism which is at one and the same time extremely simple and uncomplicated, as well as foolproof in its operation and not subject to malfunctioning under normal conditions of use. The drive to the tape 42 is associated with the shaft 96 operated by the knob 38 and has no direct relation whatsoever with turning or tilting of the track 58, which operation is effected entirely independently and in response to the knob 44 being depressed and forcing downward and backward the link rod 76.

Slack in the chains 88 and 114 may be taken up in any desired manner. For example, the bracket 94 which carries the sprocket 90 may be so arranged as to bring the chain 88 taut. In the case of the chain 114, an idler wheel 134 may be carried by an adjustment arm 136 which latter is adjustably positioned at the factory, to suit the length of the individual ball chain which is used.

It will now be understood that the selection of any desired record may be easily and quickly effected, even by an unskilled person. The user merely turns the knob 38 until the tape 42 presents at the window 40 the name of the desired selection. This will automatically effect a positioning of the carriage block 66 and the push member 70 behind the record. The user then merely depresses the knob 44, whereby the track 58 and carriage 66 together with the push member 70 are tilted, shifting forward the desired record and folder in which it is carried. The user may now easily grasp the record and folder, remove it from the device. If any other selection is desired, the same performance may be repeated at will, regardless of whether or not the first record has been replaced. However, care should be taken to replace the records in the proper stalls. If only one record is removed and used at a time, this will positively prevent any mix-up with respect to the proper sequence or arrangement of the records.

On the bevel 12 an index strip 138 is provided, said strip having the numbers 1, 2, 3 etc. corresponding to the stalls for the records. The envelopes or wrappers of the records may be correspondingly numbered, and with such arrangement there will be no mix-up if more than one record is taken at a time from the rack.

It will now be understood from the foregoing that we have provided an improved and greatly simplified phonograph record rack and selector-ejector device having numerous advantages. Relatively few parts of simple construction are involved, whereby the device may be economically fabricated and produced. Moreover, the various mechanical movements are extremely simple and of straight-forward design, and the ejector mechanism of the device is distinct and apart from the selector means, insofar as possible, all to the end that malfunctioning is prevented to the greatest possible extent. Moreover, the operation of the device is extremely simple and may be readily understood, even by an unskilled person. The device is seen to be attractive in its appearance, and relatively small and compact whereby it is convenient to use in connection with collections of records. Moreover, since the records are stored on end and may be retained in the stiff jackets or envelopes, any tendency to warping is counteracted. Moreover, the records are completely protected from dust, dirt and the like.

Variations and modifications may be made within the scope of the claims, and portions of the improvement may be used without others.

We claim:

1. In a phonograph record selector and ejector device, in combination:
   (a) a rack for holding a plurality of records side by side,
   (b) an elongate track extending substantially parallel to the axes of the records and past the edges thereof, said track being turnable about a longitudinal axis thereof,
   (c) a carriage movable longitudinally of and along the track, and carried thereby,
   (d) means for shifting said carriage along the track,
   (e) a push member on the carriage, for engaging and ejecting any one of said records, the particular record engaged and shifted depending on the location of the carriage along the track, and
   (f) means for turnably shifting the track about said longitudinal axis, to effect a corresponding movement of the carriage and push member to cause ejection of a record,
   (g) said track comprising an open-ended tubular member having a longitudinal slit,
   (h) said carriage comprising a block disposed within the tubular member and having means extending through the slit thereof, carrying the said push member,
   (i) hollow bearings surrounding the two open ends of the tubular member, supporting the latter for turning movement,
   (j) said means for shifting the carriage comprising a chain of beads extending along the inside of the tubular member, connected with the said block, and passing out through the ends of the tubular member and through the said hollow bearings,
   (k) a notched drive and a direction-changing pulley located respectively beyond the two ends of the tubular member, around which the chain of beads passes, one of said pulleys being located closely adjacent one open end of the tubular member,
   (l) the beads of said chain being individually turnable whereby they impose the least turning restraint on the track and carriage when these are turned to eject a record and regardless of the location of the carriage on the track far from or near to said one open end of the tubular member,
   (m) an indicator tape and a drum around which the tape passes and with which the tape is connected against slippage, and
   (n) non-slip transmission means connecting the said drum and notched drive pulley to insure a fixed relation between the tape position and the carriage position.

2. A device as in claim 1, wherein:
   (a) the carriage block slidably engages and has a bearing in the tubular member, and is wholly supported by said member throughout the path of travel of the block.

3. In a phonograph record selector and ejector device, in combination:
   (a) a pair of turnable drums disposed side by side, said drums having parallel axes and being located closely adjacent each other,
   (b) a normally non-stretching tape having indicia, wound around the drums a number of times and extending from one drum to the other,
   (c) the ends of the tape being respectively secured to the drums,
   (d) means providing a window through which a portion of the tape may be viewed, to reveal successive parts of the indicia thereon as the tape is moved by turning the drums,
   (e) a pair of sprocket means respectively on the drums, one sprocket means being rigid with the associated drum,
   (f) a chain passing around both said sprocket means, for effecting a positive drive between the same and for effecting simultaneous turning of the said associated drum to transfer the tape from one drum to the other,
   (g) the other of said sprocket means being turnably mounted with respect to its associated drum, and
   (h) a tensioned spring connection between said other sprocket means and its associated drum, to maintain the tape taut at all times that the drums and sprocket means turn.

4. A device as in claim 3, wherein:
   (a) manually operable remote control means are provided to effect turning of the drums,
   (b) said means comprising a knob disposed remote from the drums, comprising a drive sprocket connected to said knob and also disposed remote from the drums, and
   (c) said chain being endless and passing around said drive sprocket as well as around said sprocket means.

5. In a phonograph record selector and ejector device, in combination:
   (a) a rack for holding a plurality of records side by side,
   (b) an elongate track extending substantially parallel to the axes of the records and past the edges thereof, said track being turnable about a longitudinal axis thereof,
   (c) a carriage movable longitudinally of and along the track, and carried thereby,
   (d) means for shifting said carriage along the track,
   (e) a push member on the carriage, for engaging and ejecting any one of said records, the particular record engaged and shifted depending on the location of the carriage along the track,
   (f) means for turnably shifting the track about said longitudinal axis, to effect a corresponding movement of the carriage and push member to cause ejection of a record,
   (g) a pair of turnable drums disposed remote from said track and carriage and having their peripheries located along side each other, said drums having parallel axes and being located closely adjacent each other,
   (h) a tape having ends and having indicia thereon, said tape being wound around the drums a number of times and extending from one drum to the other,
   (i) means providing a window through which a portion of the tape may be viewed, to reveal successive parts of the indicia thereon as the tape is moved by turning the drums,
   (j) a pair of sprocket means respectively on the drums, one sprocket means being rigid with its associated drum, (k) an endless chain passing around both said sprocket means, for effecting simultaneous turning of the said associated drum to transfer the tape from one drum to the other, (l) a sprocket disposed adjacent one end of the track, said endless chain extending from the said sprocket means and passing around the said sprocket, (m) positive transmission means interconnecting the said sprocket and the carriage-shifting means for simultaneous movements, whereby the carriage position is fixedly related to the tape position at all times, and (n) a tensioned spring connection between said other sprocket means and its associated drum, to maintain the tape taut at all times that the drums and sprocket means turn.

6. A device as in claim 5, wherein:

(a) manual means are provided for turning the drums, said means comprising a manually operable member coupled to a part of said positive transmission means.

References Cited by the Examiner

UNITED STATES PATENTS

| | | | |
|---|---|---|---|
| 777,254 | 12/04 | Hawkins | 40—53 |
| 1,119,431 | 12/14 | Jones | 312—12 |
| 1,291,924 | 1/19 | King | 312—18 |
| 1,406,753 | 2/22 | Muffly | 312—19 |
| 1,408,096 | 2/22 | King | 312—18 |
| 1,593,151 | 7/26 | Whitmore | 129—16.1 |
| 1,688,224 | 10/28 | Bell | 312—10 |
| 1,840,728 | 1/32 | Longford | 312—19 |
| 2,381,517 | 8/45 | Price | 312—19 |
| 2,539,647 | 1/51 | Williams | 312—19 |

FOREIGN PATENTS

| | | |
|---|---|---|
| 392,058 | 5/33 | Great Britain. |
| 589,187 | 6/47 | Great Britain. |
| 670,288 | 4/52 | Great Britain. |

FRANK B. SHERRY, *Primary Examiner*.

CHANCELLOR E. HARRIS, *Examiner*.